Figure 1:
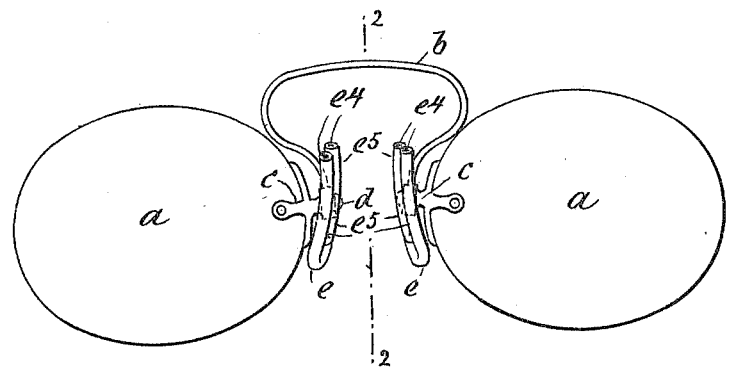

No. 821,649. PATENTED MAY 29, 1906.
J. KOVACS.
EYEGLASSES.
APPLICATION FILED FEB. 6, 1906.

WITNESSES
Ernst S Hagen
F A Stewart

INVENTOR
Joseph Kovacs
BY Edgar Tate & Co
ATTORNEYS

UNITED STATES PATENT OFFICE.

JOSEPH KOVACS, OF NEWARK, NEW JERSEY.

EYEGLASSES.

No. 821,649.            Specification of Letters Patent.            Patented May 29, 1906.

Application filed February 6, 1906. Serial No. 299,696.

*To all whom it may concern:*

Be it known that I, JOSEPH KOVACS, a citizen of the United States, residing at Newark, in the county of Essex and State of New Jersey, have invented certain new and useful Improvements in Eyeglasses, of which the following is a specification, such as will enable those skilled in the art to which it appertains to make and use the same.

This invention relates to eyeglasses; and the object thereof is to provide a pair of eyeglasses of the usual or any desired form with an improved nose clamp or clamps by means of which the glasses may be securely held on the nose without danger of injury thereof.

The invention is fully disclosed in the following specification, of which the accompanying drawings form a part, in which the separate parts of my improvement are designated by suitable reference characters in each of the views, and in which—

Figure 2:
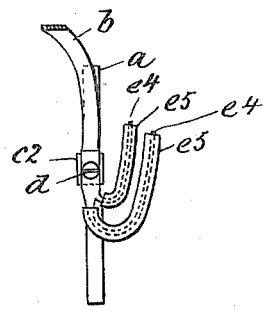
Figure 3:
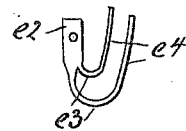

Figure 1 is a front view of an ordinary pair of eyeglasses provided with my improved nose-clamps; Fig. 2, a section on the line 2 2 of Fig. 1; and Fig. 3 a side view of the clamp-piece detached and with the cushions or pads with which said clamp-piece is provided removed therefrom.

In the drawings forming part of this specification I have shown an ordinary pair of eyeglasses, comprising the usual lenses $a$, a nose-spring $b$, and clips $c$, by means of which the nose-spring is secured to said lenses. The clips $c$ are provided with the usual head members $c^2$, with which the nose-spring $b$ is connected in the usual manner, this connection in the construction shown being made by means of screws $d$.

In the practice of my invention I provide nose-clamps $e$, which are composed of spring metal and which comprise a head member $e^2$, one end of which is provided with two curved fingers $e^3$, the said fingers being curved outwardly and upwardly at an angle to the head members $e^2$, the longer portions $e^4$ thereof projecting upwardly and backwardly above and beyond the head members $e^2$, and said longer portions $e^4$ of said fingers $e^3$ are preferably substantially parallel. The fingers $e^4$, or the parts thereof which bear on the nose, are provided with cushions $e^5$, which in the form of construction shown are tubular in form and slipped on over said fingers. The cushions $e^5$ are preferably composed of soft rubber, but may be composed of any preferred material. The nose-clamps $e$ are secured to the heads $c^2$ of the clips $c$ in the form of construction shown by the same screws that secure the nose-spring $b$ to said heads; but my invention is not limited to any particular means for securing the clamps to the clips $c$. When made in this manner, my improved nose-clamps for eyeglasses have two bearing parts or members which contact with the opposite sides of the nose and securely grasp the same, so as to hold the eyeglasses in proper position, and said bearing parts or members are elongated, so as to distribute the pressure over a greater surface of the nose than is customary with ordinary devices of this class, and injury to the nose is thus avoided.

Having fully described my invention, what I claim as new, and desire to secure by Letters Patent, is—

1. The herein-described nose-clamps for eyeglasses, said nose-clamps comprising a head member provided at one end with two separate fingers which project therefrom and are curved outwardly and backwardly at an angle thereto, the end portions of said fingers being approximately parallel, substantially as shown and described 2. The herein-described nose-clamps for eyeglasses, said nose-clamps comprising a head member provided at one end with two fingers which project therefrom and are curved outwardly and backwardly at an angle thereto, the end portions of said fingers being approximately parallel, said end portions of said fingers being also provided with cushions, substantially as shown and described.

3. The herein-described nose-clamps for eyeglasses, said nose-clamps comprising a head member provided at one end with two fingers which project therefrom and are curved outwardy and backwardly at an angle thereto, the end portions of said fingers being approximately parallel, said end portions of said fingers being also provided with cushions, consisting of rubber sleeves which are secured thereon, substantially as shown and described.

In testimony that I claim the foregoing as my invention I have signed my name, in presence of the subscribing witnesses, this 5th day of February, 1906.

JOSEPH KOVACS.

Witnesses:
F. A. STEWART,
C. E. MULREANY.